United States Patent [19]

Lee et al.

[11] 4,011,064
[45] Mar. 8, 1977

[54] MODIFYING THE SURFACE OF CUBIC BORON NITRIDE PARTICLES

[75] Inventors: Minyoung Lee, Schenectady; Lawrence E. Szala, Scotia; Louis E. Hibbs, Jr., Schenectady, all of N.Y.

[73] Assignee: General Electric Company, Schenectady, N.Y.

[22] Filed: July 28, 1975

[21] Appl. No.: 599,942

[52] U.S. Cl. .................. 51/295; 51/307; 51/309 R; 427/212; 427/215; 427/217
[51] Int. Cl.² ............... B24D 3/34; C23C 17/02
[58] Field of Search ............. 51/295, 298, 307, 308, 51/309; 427/212, 215, 217

[56] References Cited
UNITED STATES PATENTS

| | | | |
|---|---|---|---|
| 3,316,073 | 4/1967 | Kelso | 51/295 |
| 3,585,013 | 6/1971 | Bruschek | 51/295 |
| 3,645,706 | 2/1972 | Bovenkerk et al. | 51/295 |
| 3,664,819 | 5/1972 | Siqui et al. | 51/295 |
| 3,779,727 | 12/1973 | Siqui et al. | 51/298 |

Primary Examiner—Donald J. Arnold
Attorney, Agent, or Firm—Jane M. Binkowski; Joseph T. Cohen; Jerome C. Squillaro

[57] ABSTRACT

Abrasive particles are prepared by milling cubic boron nitride particles, metal compound and milling balls to smear a coating of the compound on the cubic boron nitride particles and firing the compound-coated boron nitride particles producing a rough granular adherent covering of metal and/or metal boride and/or nitride surface coating chemically bonded to the cubic boron nitride surface by metal boride and/or nitride.

6 Claims, 3 Drawing Figures

MODIFYING THE SURFACE OF CUBIC BORON NITRIDE PARTICLES

This invention relates to modifying the surface of cubic boron nitride particles to produce novel coated particles useful as abrasive.

The superhard materials, diamond and cubic boron nitride, exhibit outstanding ability for machining both metallic and non-metallic materials. In particular, they perform well in the grinding mode. However, the maximum grinding performance is never attained because of the difficulty in retaining the abrasive particles in the grinding tool matrix or bond system. Premature gross pull-out of only partially used grit is still a major factor in grinding wheel wear in resin, vitreous or metal bonds.

In the process of the present invention, adherent coatings are applied to cubic boron nitride which are chemically bonded by virtue of an intermediate metal boride and/or nitride zone or layer. The coating metals include molybdenum and tungsten, or alloys thereof which closely match cubic boron nitride in thermal expansion so as to produce low stress bonds.

Briefly stated, the present invention comprises a process for coating cubic boron nitride particles to produce abrasive particles which comprises providing milling balls made of plastic or elastomer having a diameter ranging from about one-sixteenth inch to about one-fourth inch, providing particles of a metal compound which is decomposible or reducible at atmospheric pressure at a temperature ranging from about 800° C to 1400° C to produce metal and gaseous product of decomposition, providing cubic boron nitride particles ranging in size from about 10 microns to 500 microns, milling said milling balls and said particles of metal compound and cubic boron nitride mechanically smearing a coating of said metal compound onto the surface of said cubic boron nitride particles coating said compound on at least 50 percent to about 100 percent of the surface area of said cubic boron nitride particles, recovering the metal compound-coated cubic boron nitride particles, and firing said metal compound-coated cubic boron nitride particles in a reducing or inert atmosphere at a temperature ranging from at least about 800° C to 1400° C decomposing or reducing the metal compound and producing abrasive particles, said abrasive particle consisting essentially of a cubic boron nitride particle having a rough granular adherent covering composed of an outside surface coating ranging in composition from metal to a nitride and/or boride of said metal with all composition ratios, i.e. mixtures, of said metal and metal nitride and/or boride falling within said range and a layer of nitride and/or boride of said metal intermediate said surface coating and cubic boron nitride chemically bonding said surface coating to said cubic boron nitride, said granular covering being discontinuous or continuous and non-interconnecting or interconnecting and covering from at least about 50 percent to about 100 percent of the surface area of said cubic boron nitride particle.

In carrying out the process, milling balls are used which are non-metallic and non-ceramic. Specifically, the milling balls of the present invention are made of plastic or elastomer. Examples of useful plastic are polyethylene, polypropylene and polystyrene. The elastomer can be natural or synthetic rubber. The balls should be sufficiently resilient so that during the milling step, the cubic boron nitride particles do not cut into the balls and become lodged therein, or alternatively, crush the balls preventing proper mechanical smearing of the metal compound onto the cubic boron nitride particles. Also, the milling balls should have sufficient elasticity so they they do not crush or chip the cubic boron nitride particles.

The milling balls can vary in shape as long as such shape is effective in mechanically smearing the metal compound onto the surface of the cubic boron nitride particles in accordance with the present process. For best results, the surface of the balls should be round. Preferably, the balls are spherical but they can, for example, be cylindrical. They should have a diameter ranging from about one-sixteenth inch to about one-fourth inch. Milling balls having a diameter significantly greater than one-fourth inch are not suitable because they would result in an insufficient number of balls per unit volume to provide adequate surface area necessary to effectively coat the compound on the cubic boron nitride particles whereas milling balls having a diameter less than one-sixteenth inch are too difficult to separate from the cubic boron nitride particles. Where cylindrically shaped balls are used, they should not have a length greater than twice their diameter or less than about one-half their diameter.

The metal compound is used in the form of a particulate solid which can range in size from less than one micron to the size of the cubic boron nitride particles being coated. Metal compound particles having a size significantly larger than that of the cubic boron nitride particles are not effective because they do not provide sufficient surface area for proper mechanical smearing of the compound onto the surface of the cubic boron nitride particles. However, compound particles larger than that of the cubic boron nitride particles are useful if they crush during the ball milling step. Preferably, the particle size of the metal compound is about one-tenth the size of the cubic boron nitride particles being coated.

The metal compound used in the present process is substantially completely decomposible or reducible at atmospheric pressure at a temperature ranging from about 800° C to 1400° C to metal and gaseous product or products of decomposition. Also, the metal compound is a layer lattice compound, i.e. a compound with a low shear strength between its lattice layers which allows layers of the compound particles to be rubbed off mechanically in the present ball milling step. Representative of the metal compounds useful in the present process is molybdenum sulfide ($MoS_2$), tungsten sulfide ($WS_2$), titanium sulfide ($TiS_2$), niobium sulfide ($NbS_2$), tantalum sulfide ($TaS_2$), chromium chloride ($CrCl_3$) and zirconium sulfide ($ZrS_2$).

The cubic boron nitride crystals, i.e. particles, of the present invention range in size from about 10 microns to about 500 microns.

In carrying out the present process, the milling or ball milling step is carried out in a container or mill made of a non-metallic, non-ceramic material which does not crush or chip the cubic boron nitride particles. Specifically, the container or mill is made of plastic such as polyethylene or of an elastomer such as natural or synthetic rubber. The extent to which the container is filled with milling balls, the amount of cubic boron nitride particles and the amount of metal compound used is determinable empirically depending largely on the size of the balls and particles as well as the extent of the coating of metal compound on the cubic boron nitride particles desired. Generally, the metal compound coating on the cubic boron nitride particle ranges from about 2% to about 20% by weight of the cubic boron nitride particle. For best results, about two-thirds of the container is filled with milling balls, and the cubic boron nitride particles and metal compound particles are then added to the container. The milling step can be carried out in a conventional manner. Specifically, the mill or container can be rolled, preferably at a moderate rate of speed to prevent chipping of the cubic boron nitride particles, using conventional ball milling apparatus. When the desired extent of compound is coated on the surface of the cubic boron nitride particles, the coated cubic boron nitride particles can be separated from the milling balls and any excess metal compound powder using suitable wire mesh sieves.

In a preferred embodiment of the present process which provides good control of the final product, the milling balls and metal compound particles are placed in the container and milled sufficiently to produce a coating of the metal compound on the milling balls. The compound-coated milling balls can then be separated from excess compound powder by a conventional technique such as by using suitable wire mesh sieves. The coated balls are then placed in the mill along with the cubic boron nitride particles and milled whereby the compound-coating on the balls is mechanically smeared onto the cubic boron nitride particles. In this way better control of the metal compound-coating on the cubic boron nitride particles is achieved and separation of the resulting compound-coated cubic boron nitride particles from the milling balls is more easily carried out by a conventional technique such as by using suitable wire mesh sieves.

The present process is controllable to produce the present coated cubic boron nitride particle, i.e. abrasive particle, in a number of embodiments, all of which have metal boride and/or nitride chemically bonded to the surface of the cubic boron nitride which forms during firing by solid stated diffusion between the boron and/or nitrogen atoms of the cubic boron nitride and the metal atoms of the initially deposited metal compound. Specifically, the abrasive particle consists essentially of cubic boron nitride particle having an adherent covering composed of an outside surface coating ranging in composition from metal to a boride and/or nitride of the same metal with all composition ratios, i.e. mixtures, of said metal and metal boride and/or nitride, falling within said range and a layer of boride and/or nitride of said metal intermediate said surface coating an cubic boron nitride chemically bonding the surface coating to the cubic boron nitride surface.

Those skilled in the art will gain a further and better understanding of the present invention from the figures accompanying and forming part of the specification, in which.

Figure 1:
FIG. 1 is photomicrograph (magnified 200 X) showing typical crystals of uncoated cubic boron nitride.

The present covering is rough and granular. It can range in structure from non-uniform to substantially uniform and from discontinuous to continuous. The more interconnecting or continuous the covering, the more contact it has with the cubic boron nitride surface and the less likely it is to be chipped off. Also, the more uniform the granular structure, the less likely it is to be chipped off. Generally, in contrast to grains which are round, the structure of the grains in the present covering are flaky, flat-like or planar and it is the planar surface of the grains that is usually bonded, i.e. at which bonding is effected. The covering covers from at least 50 percent to about 100 percent of the surface area of the cubic boron nitride particle.

The covering on the cubic boron nitride particle, i.e. outside surface coating and intermediate boride and/or nitride layer, can vary in thickness and generally ranges in thickness from about 1 micron to 100 microns. Specifically, the intermediate metal boride and/or nitride layer can be as thin as 2 Angstroms and detectable by transmission microscopy with thicknesses of 3 Angstroms or greater detectable by X-ray diffraction analysis.

In the present process, the firing temperature ranges from about 800° C to about 1400° C and firing is preferably carried out at atmospheric pressure. Firing also should be carried out for a period of time sufficient to substantially or completely decompose or reduce the metal compound coating to produce the present covering of metal and/or metal boride and/or nitride. Firing temperatures significantly higher than about 1400° C are not useful since they tend to graphitize, i.e. reconvert to hexagonal boron nitride, the surface of the cubic boron nitride which would be deleterious to grinding performance and would prevent adequate retention in metal or vitreous wheel bond systems.

The particular firing temperature used depends largely on the specific metal compound used, the firing atmosphere and the particular type of coated, i.e. covered, or etched abrasive particle desired. Generally, firing temperatures of about 800° C to 900° C produce a cubic boron nitride particle having a covering composed of an outer surface coating of metal with a layer of boride and/or nitride of the same metal intermediate the metal surface coating and cubic boron nitride. At temperatures above 900° C, the outer surface coating is comprised of metal and boride and/or nitride of the same metal, with the amount of metal decreasing with increasing firing temperature, or the outer surface coating can be entirely of metal boride and/or nitride.

If desired, the uniformity and continuousness or interconnectivity of the covering can be significantly increased at relatively low firing temperatures ranging from about 800° C to about 1000° C by initially heating the compound-coated cubic boron nitride particles in air at a temperature ranging from about 400° C to 700° C to convert the metal compound to metal oxide, and then firing the resulting oxide-coated particle in a reducing atmosphere such as hydrogen or hydrogen mixed with a minor amount of gaseous ammonia to reduce oxides and produce the present covering. This resulting covering usually has a substantially webbed or feathery interconnecting structure which is highly adherent to the surface of the cubic boron nitride.

The process of this invention also provides the capability of producing a stable etched surface for cubic boron nitride which is essentially unique. Specifically, at firing temperatures ranging from about 1100° C to 1400° C, significant diffusion of metal boride and/or nitride or metal and metal boride and/or nitride over the surface of the cubic boron nitride occurs accompanied by numerous localized diffusion reactions produced by metal atoms penetrating, i.e. etching, the cubic boron nitride surface forming tracks of metal boride and/or nitride therein resulting in a change in the contour of the cubic boron nitride particle. The resulting abrasive particle consists essentially of cubic boron nitride particle having a highly adherent significantly continuous covering of metal boride and/or nitride. However, where an initially relatively thick deposit or coating is made, the covering may have a minor amount of metal in its outside surface coating so that such surface coating will consist essentially of a minor amount of metal and a major amount of metal boride and/or nitride. Much of the covering, i.e. at least about 50%, is of a substantially uniform fine granular form, i.e. finer and more uniform than that normally obtained at firing temperatures below 1100° C, with a multitude of furrows usually substantially uniformly distributed therein and running significantly parallel to each other. These furrows are indicative of bonding of the covering below the surface of the cubic boron nitride by the metal boride and/or nitride tracks formed therein. Since this covering is adhered both to the surface and below the surface of the cubic boron nitride, it cannot be broken away from the cubic boron nitride in any significant amount without breaking part of the cubic boron nitride particle. The metal boride and/or nitride tracks etching, i.e. penetrating, the surface of the cubic boron nitride particle are detectable by techniques such as X-ray diffraction analysis and by microprobe analysis.

The firing atmosphere used in the present process can be varied, i.e. it can be a reducing atmosphere such as hydrogen or it can be an inert atmosphere such as argon or a vacuum, but it should be an atmosphere which has no significant deleterious effect on the metal compound-coating or cubic boron nitride particle or the resulting covering of metal and metal boride and/or nitride. Generally, it is a reducing atmosphere such as hydrogen which reduces or reacts with the metal compound to produce the present adherent covering composed of metal and/or metal boride and/or nitride coating and layer.

The firing step may be performed in a number of ways. For example, it can be carried out batchwise, or in a continuous manner using a fluidized bed, or a moving belt, in any suitable furnace using quartz, Vycor or alumina ceramic crucibles, depending upon maximum temperature used. No significant sintering of the fired cubic boron nitride particles occurs in the present process, and the final fired coated cubic boron nitride particles are easily broken up into a free flowing powder.

The present method provides a number of advantages. One advantage is that it automatically produces a very rough covering, which can be varied in both roughness and thickness through control of the milling step parameters and relative amount of input feed materials. For example, with longer milling periods, larger amounts of input feed materials of finer size and smaller sized milling balls, thicker coatings of the metal compound on the cubic boron nitride particles are produced resulting in thicker fired coverings of metal and/or metal boride and/or nitride. Also, very rough fired coverings of metal and/or metal boride and/or nitride can be produced by initially milling the cubic boron nitride particles with a mixture of large and small sized particles of the metal compound thereby mechanically smearing a substantially uneven undulating deposit or coating on the cubic boron nitride particle which, when fired, results in a correspondingly rough covering. Additional advantages are that the process equipment is inexpensive, and the technical process control requirements are minimal.

The coated, i.e. covered, cubic boron nitride particles, i.e. abrasive particles, of this invention are suitable for use in all types of abrasive and cutting tools, for example, resin bond or metal bond abrasive tools, and saw abrasive tools.

The invention is further illustrated by the following examples where conditions were as follows unless otherwise noted:

The milling balls in each of the examples were sufficiently resilient so that during the milling or rolling step, the cubic boron nitride particles did not cut into the balls and become lodged therein or crushed or chipped the balls.

All milling or rolling was carried out dry in air at room temperature on a conventional laboratory mill.

EXAMPLE 1

Figure 2:
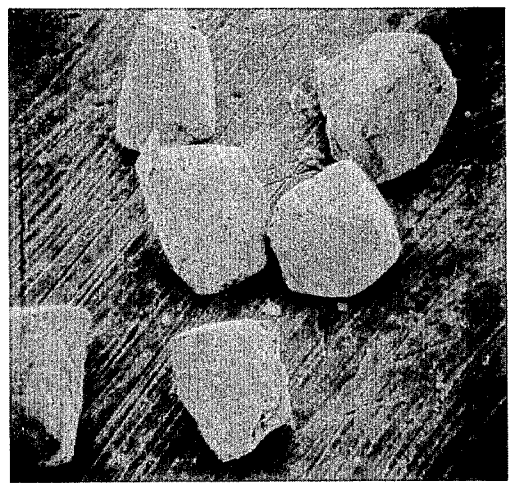
FIG. 2 is a photomicrograph (magnified about 100 X) showing cubic boron nitride crystals coated with tungsten sulfide in accordance with the present process.

A clean polyethylene bottle, about 2⅛ inches high by ⅞ inch inside diameter was charged two-thirds full with polytetrafluoroethylene (Teflon) ⅛ inch diameter spheres, i.e. balls. 1.239 grams of powdered tungsten sulfide, ($WS_2$), having a particle size of less than 40 microns were also added to the bottle which was then closed and rolled, i.e. milled, on a laboratory mill, at 60 RPM for 3 hours. Examination of the resulting balls showed them to be uniformly coated with about 0.892 gram of $WS_2$, the remainder being coated on the inside walls of the bottle. The coated balls, along with 1.116 grams of 100/120 mesh, i.e. about 125 microns to 149 microns in particle size, cubic boron nitride were placed in another identical clean bottle and rolled for 19 hours at 60 RPM on the laboratory mill. The balls and coated cubic boron nitride particles were then separated by suitable wire mesh sieves. The compound-coated cubic boron nitride particles weighed 1.415 grams, indicating a $WS_2$ coating weight of 0.299 gram. About 100% of the surface area of the cubic boron nitride particles was coated with $WS_2$ and is shown in FIG. 2.

EXAMPLE 2

Figure 3:
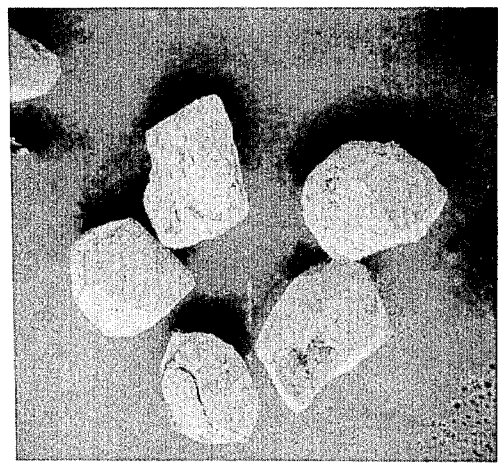
FIG. 3 is a photomicrograph (magnified 100 X) showing the tungsten coating obtained by firing the coated crystals of FIG. 2 in accordance with the present process.

The $WS_2$ coated cubic boron nitride particles of Example 1 were fired in a ceramic tube furnace in an atmosphere of hydrogen at a temperature of 1040° C for 1 hour. The resulting fired particles had a very adherent substantially continuous rough granular coating or covering as shown by FIG. 3. The granular structure of the covering was flaky in character of substantially uniform fine size. X-ray diffraction analysis of the fired coated particles determined that the covering or coating on the cubic boron nitride particles was tungsten metal. Also, the intermediate metal boride and/or nitride bonding layer, although not shown by X-ray diffraction analysis, would have been detectable by transmission microscopy.

EXAMPLE 3

In this example, the tungsten metal coated cubic boron nitride particles produced in Example 2 were tested to determine the adhesive strength and abrasion resistance of the tungsten metal coating or covering. Specifically, the fired coated particles were placed in a small glass vial and shaken vigorously for 5 minutes, using a dental "wiggle-Bug", a device for mixing dental amalgam. After such shaking, microscopic examination showed that some of the cubic boron nitride particles had cleaved along cleavage crystal planes but that the tungsten metal covering remained adherent and that there was no significant chipping or loss of the tungsten covering or coating.

EXAMPLE 4

A clean polyethylene bottle identical to that used in Example 1 was charged two-thirds full with ⅛ inch long soft rubber cylinders and 1.5 grams of powdered $MoS_2$ having a particle size less than 40 microns. The bottle was then closed and rolled for 24 hours at 60 RPM. At the end of this time it appeared that substantially all of the $MoS_2$ powder coated the rubber cylinders and no significant amount of powder was left on the inside walls of the bottle.

The present coated cubic boron nitride particles are highly useful as abrasives. Specifically, the rough granular adherent covering on the cubic boron nitride particles produced by the present process results in significantly improved grinding performance and retention in all types of wheel bond systems, i.e. resin, vitreous or metal. Also, the improved bond strength in tool matrices significantly extends the life of the abrasive.

U.S. Pat. application Ser. No. 599,941 (RD-7878) filed of even date herewith, in the names of Minyoung Lee, Lawrence E. Szala and Louis E. Hibbs, Jr. and assigned to the assignee hereof is directed to modifying the surface of diamond particles. Specifically, abrasive particles are prepared by milling diamond particles, metal compound and milling balls to smear a coating of the compound on the diamond particles and firing the compound-coated diamond particles producing a rough granular metal and/or metal carbide surface coating chemically bonded to the diamond surface by metal carbide. By reference this patent application is made part of the disclosure of the instant application.

What is claimed is:

1. A process for producing cubic boron nitride abrasive particles having a rough adherent covering which comprises providing milling balls consisting essentially of plastic or elastomer having a diameter ranging from about one-sixteenth inch to about one-fourth inch, providing particles of a metal compound which is decomposible or reducible at atmospheric pressure at a temperature ranging from about 800° C to 1400° C to produce metal and gaseous product of decomposition, said metal compound being selected from the group consisting of molybdenum sulfide, tungsten sulfide, titanium sulfide, niobium sulfide, tantalum sulfide, chromium chloride, zirconium sulfide, and mixtures thereof, providing cubic boron nitride particles ranging in size from about 10 microns to 500 microns, milling said milling balls and said particles of metal compound and cubic boron nitride mechanically smearing a coating of said metal compound onto the surface of said cubic boron nitride particles coating said compound on at least 50 percent to about 100 percent of the surface area of said cubic boron nitride particles, said milling balls having a shape and sufficient elasticity and resiliency to effect said mechanical smearing, recovering the metal compound-coated cubic boron nitride particles, and firing said metal compound-coated cubic boron nitride particles in a reducing or inert atmosphere at a temperature ranging from at least about 800° C to 1400° C decomposing or reducing the metal compound and producing said abrasive particles, said abrasive particle consisting essentially of a cubic boron nitride particle having a rough granular adherent covering consisting essentially of an outside surface coating ranging in composition from said metal to a mixture of boride and nitride of said metal with all mixtures of said metal and metal boride and nitride falling within said range, and a layer of a mixture of boride and nitride of said metal intermediate said surface coating and said cubic boron nitride particle chemically bonding said surface coating to said cubic boron nitride particle, said covering being discontinuous or continuous and covering from at least 50 percent to about 100 percent of the surface area of said cubic boron nitride particle.

2. The process according to claim 1 wherein said firing temperature ranges from about 1100° C to 1400° C producing penetration of the cubic boron nitride surface with tracks of said metal boride and nitride, and wherein said outside surface coating consists essentially of up to a minor amount of said metal and a mixture of said metal boride and nitride, and wherein said covering is significantly continuous with a significantly uniform fine granular structure with a multitude of furrows distributed therein running significantly parallel to each other.

3. A process for producing cubic boron nitride abrasive particles having a rough adherent covering which comprises providing milling balls consisting essentially of plastic or elastomer having a diameter ranging from about one-sixteenth inch to about one-fourth inch, providing particles of a metal compound which is decomposible or reducible at atmospheric pressure at a temperature ranging from about 800° C to 1400° C to produce metal and gaseous product of decomposition, said metal compound being selected from the group consisting of molybdenum sulfide, tungsten sulfide, titanium sulfide, niobium sulfide, tantalum sulfide, chromium chloride, zirconium sulfide, and mixtures thereof, milling said milling balls and said particles of metal compound producing a coating of said compound on the milling balls, milling the resulting metal compound-coated milling balls with cubic boron nitride particles ranging in size from about 10 microns to 500 microns, mechanically smearing a coating of said metal compound onto the surface of said cubic boron nitride particles coating said compound on at least 50 percent to about 100 percent of the surface area of said cubic boron nitride particles, said milling balls having a shape and sufficient elasticity and resiliency to effect said mechanical smearing, recovering the metal compound-coated cubic boron nitride particles, and firing said metal compound-coated cubic boron nitride particles in a reducing or inert atmosphere at a temperature ranging from at least about 800° C to 1400° C decomposing or reducing the metal compound and producing said abrasive particles, said abrasive particle consisting essentially of a cubic boron nitride particle having a rough granular adherent covering consisting essentially of an outside surface coating ranging in composition from said metal to a mixture of boride and nitride of said metal with all mixtures of said metal and metal boride and nitride falling within said range and a layer of a mixture of boride and nitride of said metal intermediate said surface coating and said cubic boron nitride particle chemically bonding said surface coating to said cubic boron nitride, said covering being discontinuous or continuous and covering from at least 50 percent to about 100 percent of the surface area of said cubic boron nitride particle.

4. A process for producing cubic boron nitride abrasive particles with a rough adherent covering which comprises providing milling balls consisting essentially of plastic or elastomer having a diameter ranging from about one-sixteenth inch to about one-fourth inch, providing particles of a metal compound which is decomposible or reducible at atmospheric pressure at a temperature ranging from about 800° C to 1400° C to produce metal and gaseous product of decomposition, said metal compound being selected from the group consisting of molybdenum sulfide, tungsten sulfide, titanium sulfide, niobium sulfide, tantalum sulfide, chromium chloride, zirconium sulfide, and mixtures thereof, providing cubic boron nitride particles ranging in size from about 10 microns to 500 microns, milling said milling balls and said particles of metal compound and cubic boron nitride mechanically smearing a coating of said metal compound onto the surface of said cubic boron nitride particles coating from at least 50 percent to about 100 percent of the surface area of said cubic boron nitride particles, said milling balls having a shape and sufficient elasticity and resiliency to effect said mechanical smearing, recovering the metal compound-coated cubic boron nitride particles, heating said metal compound-coated cubic boron nitride particles in air to oxidize said metal compound to metal oxide, and firing the resulting metal oxide-coated cubic boron nitride particles in a reducing atmosphere at a temperature ranging from at least about 800° C to about 1000° C reducing the metal compound and producing said abrasive particles, said abrasive particle consisting essentially of a cubic boron nitride particle having a rough granular adherent covering consisting essentially of an outside surface coating ranging in composition from said metal to a mixture of boride and nitride of said metal with all mixtures of said metal and metal boride and nitride falling within said range, and having a layer of a mixture of boride and nitride of said metal intermediate said surface coating and said cubic boron nitride particle chemically bonding said surface coating to said cubic boron nitride particle, said covering being discontinuous or continuous and covering from at least 50 percent to about 100 percent of the surface area of said cubic boron nitride particle.

5. An abrasive particle consisting essentially of cubic boron nitride particle having a rough adherent flaky granular covering, said covering consisting essentially of an outside surface coating ranging in composition from metal to a mixture of boride and nitride of said metal with all mixtures of said metal and metal boride and nitride falling within said range, and a layer of a mixture of boride and nitride of said metal intermediate said surface coating and said cubic boron nitride particle bonding said surface coating to said cubic boron nitride particle, said metal being selected from the group consisting of molybdenum, tungsten, titanium, niobium, tantalum, chromium, zirconium and alloys thereof, said covering ranging in structure from nonuniform to substantially uniform and from discontinuous to continuous and covering from at least 50 percent to about 100 percent of the surface area of said cubic boron nitride particle.

6. An abrasive particle according to claim 5 wherein said outside surface coating consists essentially of up to a minor amount of said metal and a mixture of boride and nitride of said metal, and wherein said covering is significantly continuous with a significantly uniform fine granular structure with a multitude of furrows distributed therein running significantly parallel to each other, said covering also being bonded to the cubic boron nitride particle by tracks of said metal boride and nitride penetrating the cubic boron nitride surface.

* * * * *